J. M. MESCHUTT.
FIRE TONGS.
No. 22,086.  Patented Nov. 16, 1858.
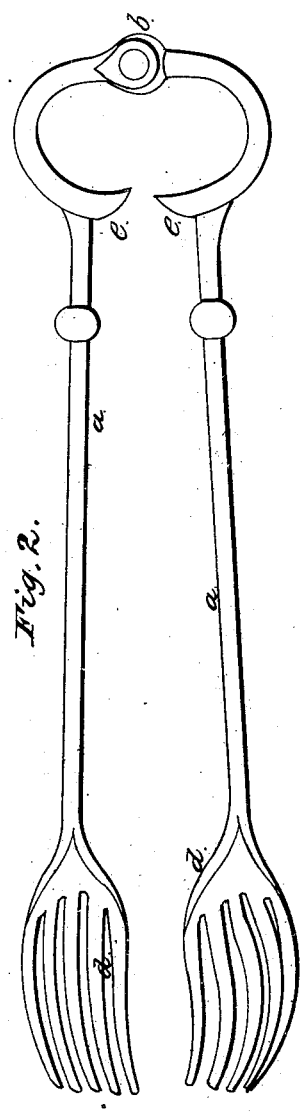
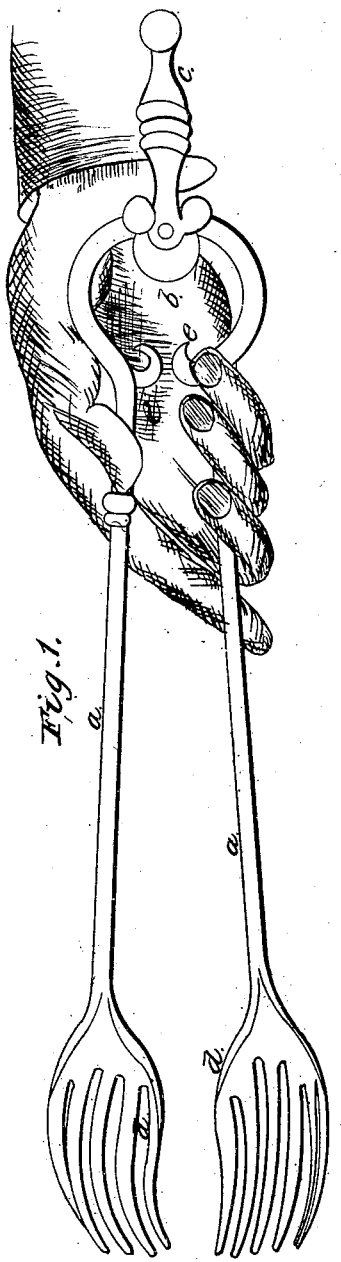
Witnesses:
Lemuel W. Sewell
Thomas G. Harold
Inventor:
J. M. Meschutt

UNITED STATES PATENT OFFICE.

JAMES M. MESCHUTT, OF NEW YORK, N. Y.

TONGS FOR COAL, &c.

Specification of Letters Patent No. 22,086, dated November 16, 1858.

*To all whom it may concern:*

Be it known that I, JAMES M. MESCHUTT, of the city and State of New York, have invented, made, and applied to use a certain new and useful Improvement in Tongs for Use with Coal Fires; and I do hereby declare that the following is a full, clear, and exact description of the construction and operation of the same, reference being had to the annexed drawing, making part of this specification, wherein—

Figure 1, is a perspective view of my said tongs as in use, and Fig. 2, is a perspective view of the said tongs in a slightly different form.

Similar marks of reference denote the same parts.

$a$, $a$, are the legs of my tongs jointed together at $b$, and a handle $c$, (Fig. 1,) may be provided at this point if desired. In place of the ordinary flat ends to the legs, I make use of fingers or curved prongs $d$, $d$, which setting opposite to each other enable the party using the same to take hold of coals, clinkers, cinders and similar articles with great facility; my tongs however would not be perfect without the projections $e$, $e$, close to that part of the legs at which the hand of the operator seizes the tongs, the object of these projections being to prevent pressure by the hand, forcing the prongs or fingers $d$, $d$, past each other so as to overlap and stick or bind together in a manner that would be a great inconvenience to the party using the same; particularly so as the said fingers to retain any articles they are adapted to, only require to touch at the ends of the fingers.

I am fully aware that oyster rakes sugar tongs and similar articles have been devised, but the present invention is more than a simple application of an old device to a new purpose, it is a new and useful article of manufacture that has never been made before my invention thereof.

The said tongs are adapted to coal fires and are as beneficial as the ordinary tongs are with wood fires, which tongs are useless with coal fires; and besides this my said tongs are applicable under a variety of circumstances in household affairs such as removing the burning coals from a fire no longer needed to be burning, cleaning out cinders, clinkers &c. from grates instead of using the hands, at the same time permitting the ashes to fall away; and large lumps of coal can be placed onto or removed from the fire in any manner desired.

What I claim as my invention and desire to secure by Letters Patent as a new article of manufacture, is—

The metallic tongs for coal fires &c., constructed with fingers or curved prongs and the projections for the purpose of preventing the fingers coming too closely together substantially as specified.

In witness whereof I have hereunto set my signature this fifteenth day of October 1858.

J. M. MESCHUTT.

Witnesses:
LEMUEL W. SERRELL,
THOMAS G. HAROLD.